United States Patent [19]
Penman

[11] 3,820,196
[45] June 28, 1974

[54] FISH CLEANING DEVICE AND METHOD FOR FILLETING

[76] Inventor: Melvin C. Penman, 560 Heim Rd., Getzville, N.Y. 14068

[22] Filed: June 19, 1972

[21] Appl. No.: 263,763

Related U.S. Application Data

[62] Division of Ser. No. 50,848, June 29, 1970, Pat. No. 3,672,002.

[52] U.S. Cl. .................................. 17/46, 17/66
[51] Int. Cl. ........................................ A22c 25/16
[58] Field of Search ..................... 17/66, 69, 46

[56] References Cited
UNITED STATES PATENTS

| | | | |
|---|---|---|---|
| 2,234,658 | 3/1941 | Smith | 17/46 X |
| 2,577,686 | 12/1951 | Hunt | 17/46 |
| 3,321,801 | 5/1967 | Westerdahl | 17/46 X |

Primary Examiner—Lucie H. Laudenslager
Attorney, Agent, or Firm—E. Herbert Liss

[57] ABSTRACT

A hand tool having a handle with a concave blade at each end and a method for obtaining a skinless, boneless one piece fillet. The blade includes a linear shearing edge boneless a curvilinear shearing edge conforming to the rib cage of a fish, the edges converging to an apex. The apex of the blade may be inserted in a slit along the backbone of the fish terminating in a transverse slit at the tail. With the concavity facing toward the tail, the linear shearing edge bearing against the inner surface of the skin and the curvilinear shearing edge embracing the rib cage, the tool is moved from the head toward the tail to remove substantially all of the flesh portion of the fish with a plow-like action. The blades are mirror images of each other, one being suitable for use on one side of the fish and the other blade suitable for use on the opposite side of the fish.

2 Claims, 7 Drawing Figures

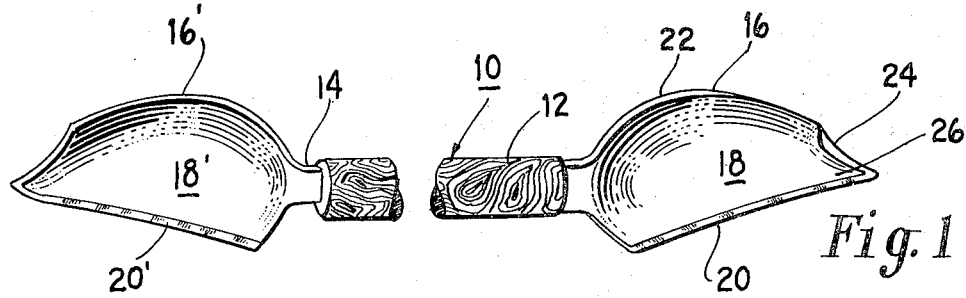
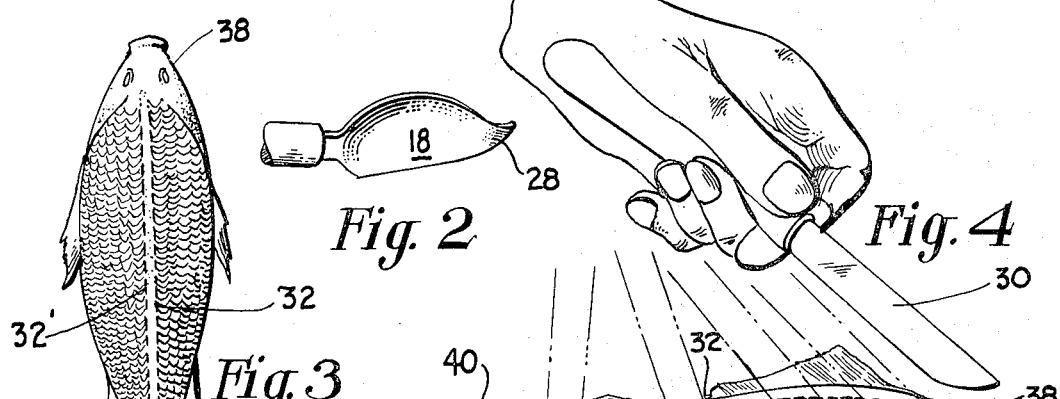
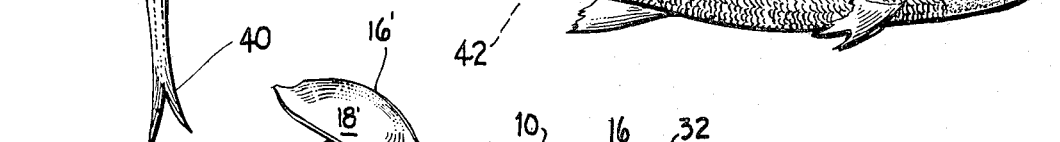
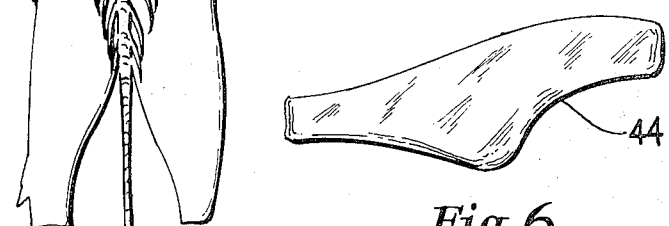

FISH CLEANING DEVICE AND METHOD FOR FILLETING

This is a division, of application Ser. No. 50,848 filed on June 29, 1970, now U.S. Pat. No. 3,672,002, dated June 27, 1972.

BACKGROUND OF THE INVENTION

The invention relates to hand tools and a method for cleaning fish and more particularly to a filleting tool and method for obtaining skinless and boneless one piece fillets.

With known methods of filleting fish much skill and experience are required. The fish are first scaled and then boned, sometimes followed by the separate skinning step. These processes are time consuming and result in loss of much of the edible flesh of the fish. Often with known methods bones are inadvertently left in the fillet. In some instances, because of the skill required and the time necessary to remove the skin, the skin is left with the edible flesh.

Hand tools for cleaning fish utilizing a concave scraper are known for use in eviscerating and removing entrails of fish and for scaling fish as well as for opening bellies of fish. For example, U.S. Pat. No. 2,968,060 which discloses a tool for opening the belly of a fish includes a spoon-shaped protective device for recovering the roe without mutilation. U.S. Pat. No. 3,290,720 discloses a concave or spoon-shaped scraper for removing entrails. However, none of these concave scrapers disclose a pair of cooperating shearing edges for removing the entire edible portion of the flesh while avoiding opening of the belly and removing of the entrails.

SUMMARY OF THE INVENTION

In accordance with the present invention a skinless, boneless fillet is obtained utilizing a tool having a concave or spoonlike blade with a linear shearing edge on one side thereof and a curvilinear shearing edge on the other side thereof cooperating with the linear shearing edge to remove the entire edible flesh between the rib cage and the skin. The above-mentioned edges converge toward an apex which can readily be inserted in a longitudinal slit through the flesh of the fish reaching to the rib cage. The apex is bent slightly laterally to avoid mutilation and cutting of the rib cage as the tool is moved with respect to the fish for removing the edible flesh. A blade of this type is disposed at each end of a handle, the blades being mirror images of each other so that one is suitable for use on one side of the fish while the other is suitable for use on the other side of the fish. Scaling, opening of the belly and removal of entrails is avoided when the tool of the present invention is utilized.

A simple method for filleting the fish with a tool of this type involves first slitting the fish longitudinally along each side of the backbone from the head to a point adjacent the tail and terminating the slit with a transverse slit adjacent the tail or caudal fin. The blade is then inserted into the longitudinal slit adjacent the head of the fish and is drawn rearwardly toward the caudal fin with a curvilinear shearing edge embracing the outer side of the rib cage and with a linear edge adjacent the inner surface of the skin. The concavity of the blade faces the tail of the fish, and as the blade is drawn rearwardly a shearing and plowing action occurs as a single piece boneless and skinless fillet rolls out at the leading concave surface of the tool. Thus a boneless, skinless fillet is obtained. This process is repeated with the other blade on the other side of the fish to obtain a second boneless, skinless fillet.

The principal object of the present invention is to provide a simple and efficient tool for extracting in one piece, without bones or skin attached thereto, substantially the entire edible flesh portion of a fish.

Another object of the invention is to provide a method for filleting a fish to obtain a skinless, boneless fillet in a simple and efficient manner.

Other objects and advantages of the invention will be apparent from the following detailed description taken in connection with the accompanying drawings.

BRIEF DESCRIPTION OF THE DRAWINGS

FIG. 1 is an elevational view of the tool of this invention looking toward the concavity of the blades.

FIG. 2 is a fragmentary perspective view of one blade of the tool of this invention.

FIG. 3 is a top elevational view of a fish showing the position of the dorsal slits in preparation for filleting.

FIG. 4 is a view of the fish showing the dorsal or longitudinal slit and the transverse slit.

FIG. 5 is a sectional view of the fish with the filleting operation in progress.

FIG. 6 is an elevational view of the fillet obtained by the article and method of this invention.

FIG. 7 is the remaining disposable skin and skeletor portions of the fish following the filleting operation.

DESCRIPTION OF THE PREFERRED EMBODIMENT

In FIG. 1 there is shown a filleting tool 10 having a handle 12 of suitable plastic or fibrous material wrapped or formed about a shank 14 between a pair of blades 16 and 16'. The shank 14 may be an integral element or may be formed separately with each of the blades 16 and 16' respectively. The faces 18 and 18' of the blades 16 and 16' are concave, the concavity facing the same side in each of the blades. An edge 20 of the blade 16 may be substantially linear and extends somewhat obliquely to the shank 14. The major portion 22 of the other edge is convex and the minor portion 24 thereof is of concave curvilinear shape and is substantially an arc of an ellipse which conforms substantially to the curvature of the rib cage of a fish. The edges 20 and 24 may be sharpened to form shearing edges and converge to form an apex 26. The end portion of the apex 26 may be bent slightly away from the concave face 18 as 28, best shown in FIG. 2. The blade 16' is substantially identical to the blade 16 and is a mirror image thereof.

The method of filleting a fish utilizing this tool comprises the step of slitting the fish with a sharpened knife 30 longitudinally on each side of the backbone shown in FIGS. 3 and 4 at 32 and 32'. The slit extends through the scales, skin and flesh to the rib cage 36 of the fish from a point adjacent the head 38 to a point adjacent the tail or caudal fin 40. It terminates in a transverse slit 42 extending through to the ventral portion of the fish adjacent the caudal fin 40. The fish is then placed on its side and the apex of the blade 16 is inserted into the slit 32 adjacent the head 38 of the fish with the edge 24 embracing the rib cage 36 and the edge 20 extending through the flesh to the inner surface of the skin. The concavity 18 faces the tail 40. The blade plowing tool 16 is then moved along longitudinally toward the tail in the direction of the concavity and, as it moves, shearing edges 24 and 20 shear the meat from the rib cage 36 and the skin of the fish respectively with a plow-like action. The edible flesh rolls out in advance of the blade 16 at the concave surface 18 as shown in FIG. 4 and remains in one piece as seen in FIG. 6. When the blade reaches the slit 42 a fillet 44, shaped substantially like that shown in FIG. 6, is obtained.

It will now be apparent that a unique tool and novel method for filleting fish has been provided by this invention. The tool is simple in construction and efficient, and with the use of this tool scaling, opening of the belly and removal of the entrails is avoided. A skinless, boneless fillet is obtained which includes substantially all of the edible flesh portion of the fish. Utilizing the method and tool of this invention, filleting a fish in the above described manner can be rapidly accomplished and a large number of fish filleted in a brief period of time.

Although a specific embodiment of the invention has been described for the purpose of illustration it will be apparent that various modifications and other embodiments are possible within the scope of the invention. It is to be understood, therefore, that the invention is not limited to the specific arrangement shown but in its broadest aspects it includes all equivalent embodiments and modifications which come within the scope of the invention.

What is claimed is:

1. A method for filleting fish comprising the steps of cutting a longitudinal slit extending from the head to the tail of the fish adjacent the backbone through the skin and flesh to the rib cage, cutting a transverse slit adjacent the tail extending from the end of said longitudinal slit to the ventral portion of the fish, laying the fish flat on its side on a flat, hard surface with the longitudinal and transverse slits facing the surface, inserting a plowing tool into the longitudinal slit at the head end of the flesh and piercing through the flesh, plowing simultaneously the flesh between the skin and the skeleton from adjacent the head end in the direction of the tail end toward the transverse slot adjacent the tail to produce a boneless, skinless fillet.

2. A method for filleting fish comprising the steps of cutting a longitudinal slit adjacent each side of the backbone of the fish extending from the head to the tail of the fish and through the skin and flesh to the rib cage, cutting a transverse slit on each side of the fish adjacent the tail extending from the end of said longitudinal slit to the ventral portion of the fish, lying the fish on its side on a surface, inserting a plowing tool into the lower longitudinal slit at the head end of the fish and piercing the flesh between the skin and the skeleton, simultaneously plowing the flesh between the skin and the skeleton from adjacent the head end in the direction of the tail end toward the transverse slot adjacent the tail to produce a boneless, skinless fillet, turning the fish over on its other side and repeating the steps of inserting a plowing tool and piercing the flesh between the skin and the skeleton and simultaneously plowing the flesh between the skin and the skeleton from adjacent the head in the direction of the tail end toward the transverse slot adjacent the tail to produce a second boneless skinless fillet.

* * * * *

PO-1050
(5/69)

UNITED STATES PATENT OFFICE
CERTIFICATE OF CORRECTION

Patent No. __3,820,196__   Dated __June 28, 1974__

Inventor(s) __Melvin C. Penman__

It is certified that error appears in the above-identified patent and that said Letters Patent are hereby corrected as shown below:

Abstract, line 4 - After "edge" delete --boneless-- and substitute --and--.
Col. 2, line 28 - Change "skeletor" to --skeleton--.
Col. 4, line 6 - After "of the" (first occurrence) delete --flesh-- and substitute --fish--.

Signed and sealed this 1st day of October 1974.

(SEAL)
Attest:

McCOY M. GIBSON JR.
Attesting Officer

C. MARSHALL DANN
Commissioner of Patents